May 22, 1956  J. M. HILDYARD  2,746,480
APPARATUS FOR THE MEASUREMENT AND CONTROL OF FLUIDS
Original Filed May 10, 1946
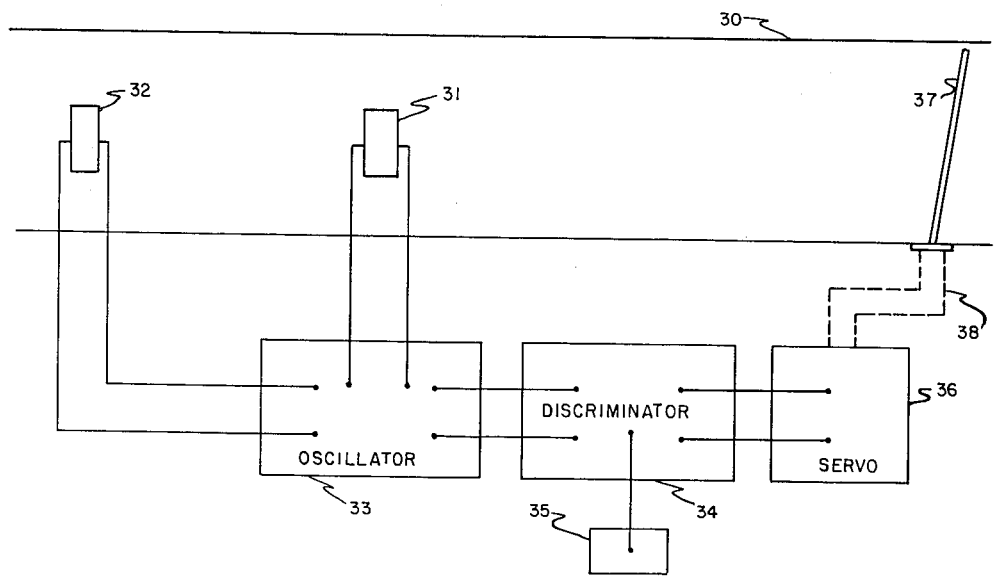
FIG. 1
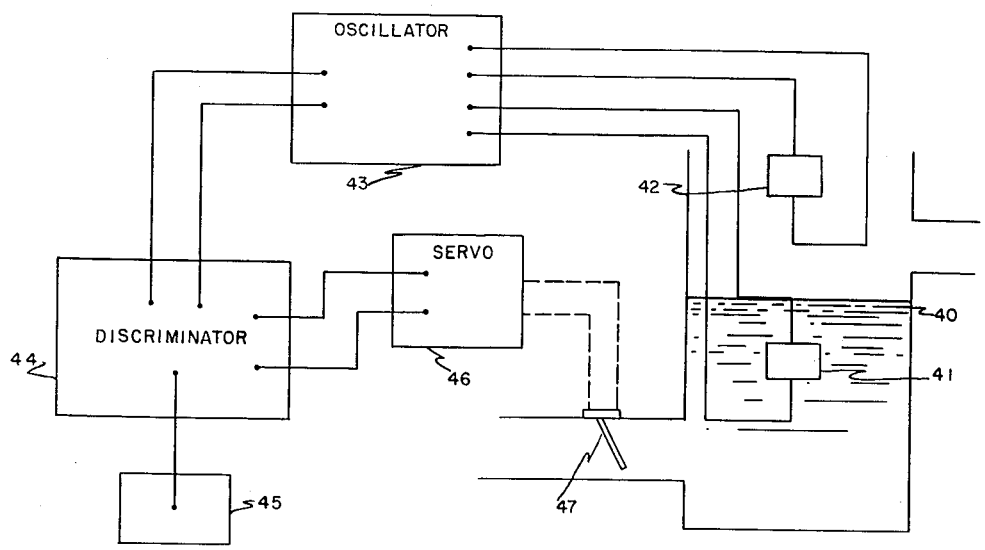
FIG. 2
JOSEPH M. HILDYARD
INVENTOR.
BY 
HIS ATTORNEY

United States Patent Office 2,746,480
Patented May 22, 1956

2,746,480

APPARATUS FOR THE MEASUREMENT AND CONTROL OF FLUIDS

Joseph M. Hildyard, Arlington, Va.

Original application May 10, 1946, Serial No. 668,996. Divided and this application May 15, 1953, Serial No. 356,018

2 Claims. (Cl. 137—386)

(Granted under Title 35, U. S. Code (1952), sec. 266)

The invention described herein may be manufactured and used by or for the Government for governmental purposes, without the payment to me of any royalty thereon.

This application is a division of application for patent, Serial No. 668,996, of Joseph M. Hildyard, filed May 10, 1946, for Flowmeter, now abandoned.

This invention is in fluid measuring and controlling apparatus.

The principal object of the invention is to provide means for maintaining and measuring fluid conditions.

A further object is to provide an instrument for measuring and controlling physical states, particularly flow of a substance, in such a manner that there need be no mechanical linkages between the sensing device and the indicating or controlling device, thus obviating the need for packing glands about moving parts linking the said sensing and external devices.

Additional objects are to provide means for controlling temperature, pressure, and related characteristics of fluids.

Other objects will be apparent from a reading of the following specification and claims.

In the drawings:

Figure 1 illustrates in diagram one form of the invention; and

Figure 2 illustrates an adaptation of the device of Figure 1.

According to Figure 1 of the drawings, there may be seen a pipe 30 which is supplied with two spaced crystals 31 and 32 which should be assumed to be mounted in any convenient fashion. Crystal 31 is a part of the plate circuit of a tuned plate-tuned grid oscillator 33, while crystal 32 is a part of the grid circuit of the oscillator.

It should be understood that "crystals" are described and shown herein only as one specific embodiment of the invention. There are, in fact, a number of electrorestrictive and magnetostrictive devices which may be employed in like fashion. These devices as a group are commonly referred to as electro-mechanical transducers and this and similar terms may hereinafter be used in the description and claims.

The output of oscillator 33 is fed to a discriminator 34 with a conventional tuning means 35. The discriminator signal in turn controls servo motor 36, which motor opens and closes valve 37 through linkage 38 to vary the fluid through conduit 30.

Crystals 31 and 32 are coupled by the fluid column which should be assumed to be within the pipe 30. Under the circumstances a variation in the rate of flow of fluid produces a proportionate change in the frequency of oscillator 33, the oscillator automatically adjusting itself so that the response of crystal 32 always arrives at the grid of the oscillator 33 in proper phase with the oscillations of the plate circuit. A low pass filter may be inserted between crystal 32 and the oscillator so that the system as a whole will respond only to the appropriate fundamental frequency.

As shown in Figure 2, the device of Figure 1 can readily be applied to a tank or other receptacle to respond to the level of fluid within the tank so as to maintain the level at some predetermined value.

The showing of Figure 2 includes a tank 40, a driven crystal 41, and a second crystal 42, the former being submerged within the body of a liquid and the latter being located above the surface thereof. An oscillator 43, similar to oscillator 33 of Figure 1, is provided and cooperates through a discriminator 44, tuned by means 45, with a servo motor 46 to drive valve 47 and thereby to affect the level of fluid in tank 40.

This structure of Figure 2 operates in a manner similar to that of Figure 1, the only necessary difference in the structures involving calibration of the tuning device 45 so as to take into account the fact that the propagation of a signal from crystal 41 to pickup 42 will be partly through liquid and partly through gas. It is moreover to be noted that as the extent of travel through the one medium increases (because of a change in fluid level), the extent of travel through the other instantaneously and correspondingly decreases. Furthermore, it is well known that the velocity of wave propagation through liquid and gas (at least, at like pressures) will differ considerably. These facts, however, bear only on the calibration of the instrument.

While the devices of the drawings have been described in connection with flow and fluid level, it will be apparent that they can be used as well to control many other conditions of fluids in view of the fact that in gases, and to a somewhat less extent in liquids, temperature, density, etc., and velocity of sound propagation are interrelated factors. The structure of Figure 1, for example, will respond as well to variations in the temperature of a gas in conduit 30 as to velocity changes although different calibration will, of course, be necessary.

No consideration has hereinabove been given to the spacing of the pickups, velocity of flow, etc. These factors will be determined by the conditions involved. Generally, however, too large distances between the transmitting member and the pickups will be disadvantageous not only because the instrument will be unwieldy but also because the attenuation of the transmitted signal will be too severe.

Further, the distance should preferably not be greater than that which will provide a 360° phase shift. From this standpoint, temperature, density, and, particularly, velocity of the fluid under study must be taken into account. The vibrating elements may be placed very close together, if desired, except that there should be a free flow of fluid between them (in the case of a flowmeter) and there should be good circulation between them (for temperature measurement and the like).

For an example of the manner in which the positions of the elements of my apparatus may be calculated, assume that a fluid within a pipe will attain velocities of no higher than fifty linear feet per second and that fluid at the pressure and temperature involved will transmit sound at 1100 feet per second; further assume that the receiving element is located downstream from the transmitting element. If the pickup elements are spaced apart one foot, the maximum practicable frequency for the driving crystal would be 24,200 cycles per second. Under circumstances of zero flow in the fluid, twenty-two complete cycles would then occur between the transmitting and receiving crystals. At a fluid velocity of fifty feet per second (maximum), the velocity of wave propagation from the driving crystal to the pickup would be 1150 feet per second, and 21.05 cycles would occur between the two elements, and this represents, of course, something less than a 360° phase shift.

It will be seen that, in addition to the advantages of accuracy and great flexibility, important benefits are afforded by my invention in that no stuffing boxes need be used since mechanical connections are not required between the exterior and the interior of the conduit or other vessel. Likewise, the system is simpler than one utilizing expensive gas pressure instrument lines, manometer lines, or capillary tubes which, while requiring no stuffing boxes, do require fluid-tight connections and extensive maintenance in the way of heating and cooling and protection against the elements.

The foregoing description is specific, and many modifications and adaptations will suggest themselves. For the true scope of the invention, reference should, therefore, be had to the appended claims.

I claim:

1. In an apparatus of the nature described, a vessel for fluid, an electro-mechanical transducer located in said vessel and below the normal fluid level thereof, a second electro-mechanical transducer located above the normal fluid level in said vessel, an oscillator connected to one of said transducers for causing the same to vibrate and to transmit its vibrations to the other of said transducers, circuit means responsive to said other transducer for varying the frequency of said oscillator.

2. In an apparatus of the nature described, a vessel for fluid, adjustable valve means for varying the fluid in said vessel, an electromechanical transducer located in said vessel below the normal fluid level therein, another electromechanical transducer located above the normal fluid level in said vessel, an oscillator, means connecting said oscillator to one of said transducers for driving the same at a predetermined high frequency, means connecting the other transducer to said oscillator for varying the frequency of the output thereof, and means responsive to variations in the frequency of the output of said oscillator for adjusting said valve means.

References Cited in the file of this patent

UNITED STATES PATENTS

| | | |
|---|---|---|
| 2,277,037 | Clark | Mar. 24, 1942 |
| 2,283,750 | Mikelson | May 19, 1942 |
| 2,472,249 | De Giers | June 7, 1949 |
| 2,483,821 | Firestone | Oct. 4, 1949 |
| 2,523,363 | Gehman | Sept. 26, 1950 |
| 2,669,121 | Garman et al. | Feb. 16, 1954 |

FOREIGN PATENTS

| | | |
|---|---|---|
| 574,819 | Great Britain | Jan. 22, 1946 |
| 623,022 | Great Britain | May 11, 1949 |